United States Patent
Aylward et al.

(10) Patent No.: US 12,149,645 B2
(45) Date of Patent: Nov. 19, 2024

(54) METHOD, COMPUTER PROGRAM AND SYSTEM FOR ENABLING A VERIFICATION OF A RESULT OF A COMPUTATION

(71) Applicant: Sony Group Corporation, Tokyo (JP)

(72) Inventors: Conor Aylward, Stuttgart (DE); Johan Duyshaver, Stuttgart (DE); Cristian Traum, Stuttgart (DE); Romain Henneton, Stuttgart (DE); Ales Novak, Stuttgart (DE); Olivier Elshocht, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 299 days.

(21) Appl. No.: 17/764,197

(22) PCT Filed: Oct. 6, 2020

(86) PCT No.: PCT/EP2020/077987
§ 371 (c)(1),
(2) Date: Mar. 28, 2022

(87) PCT Pub. No.: WO2021/069436
PCT Pub. Date: Apr. 15, 2021

(65) Prior Publication Data
US 2022/0345323 A1    Oct. 27, 2022

(30) Foreign Application Priority Data
Oct. 8, 2019  (EP) ..................................... 19201920

(51) Int. Cl.
*H04L 9/00*  (2022.01)
*H04L 1/24*  (2006.01)
(Continued)

(52) U.S. Cl.
CPC .................. *H04L 9/50* (2022.05); *H04L 1/24* (2013.01); *H04L 9/321* (2013.01); *H04L 9/3218* (2013.01); *H04L 67/10* (2013.01)

(58) Field of Classification Search
CPC ......... H04L 1/24; H04L 9/321; H04L 9/3218; H04L 9/50; H04L 67/10
See application file for complete search history.

(56) References Cited

U.S. PATENT DOCUMENTS 11,782,758 B2 * 10/2023 Galindo ................ H04L 9/3221
713/168
2017/0091391 A1   3/2017 Le-Pendu
(Continued)

FOREIGN PATENT DOCUMENTS

| AU | 2018100340 A4 | 5/2018 |
| CN | 108874665 A | 11/2018 |
| WO | 2018/177520 A1 | 10/2018 |

OTHER PUBLICATIONS

Narayan, "A Brief Intro to Smart Contracts and Their Endless Possibilities", codebrahma.com (Year: 2017).*
(Continued)

*Primary Examiner* — Michael A Keller
(74) *Attorney, Agent, or Firm* — XSENSUS LLP

(57) ABSTRACT

Examples relate to a method, a computer program and a system for enabling a verification of a result of a computation obtained from a third party. The method comprises providing a model on a distributed ledger, the model representing the computation used by the third party. The method comprises providing access to the model for one or more users, to enable the users to verify the result of the computation.

18 Claims, 2 Drawing Sheets

(51) Int. Cl.
  H04L 9/32    (2006.01)
  H04L 67/10   (2022.01)

(56)                References Cited

U.S. PATENT DOCUMENTS

2017/0286717 A1    10/2017  Khi et al.
2018/0365412 A1*   12/2018  Israel ...................... H04L 67/10
2019/0228006 A1     7/2019  Tormasov et al.
2019/0229919 A1     7/2019  Gurkan et al.
2019/0229920 A1*    7/2019  Naqvi ................... H04L 9/3239
2020/0126075 A1*    4/2020  Fisch .................. G06F 21/6245
2021/0226795 A1*    7/2021  Covaci .................. H04L 9/0894
2022/0058285 A1*    2/2022  Trenholm ........... G06F 16/9024
2022/0345312 A1*   10/2022  Larmuseau ........ G06Q 20/3829

OTHER PUBLICATIONS

International Search Report and Written Opinion mailed on Dec. 7, 2020, received for PCT Application PCT/EP2020/077987, Filed on Oct. 6, 2020, 11 pages.

\* cited by examiner

METHOD, COMPUTER PROGRAM AND SYSTEM FOR ENABLING A VERIFICATION OF A RESULT OF A COMPUTATION

CROSS-REFERENCE TO RELATED APPLICATIONS

The present application is based on PCT filing PCT/EP2020/077987, filed Oct. 6, 2020, which claims priority to EP 19201920.6, filed Oct. 8, 2019, the entire contents of each are incorporated herein by reference.

FIELD

Examples relate to a method, a computer program and a system for enabling a verification of a result of a computation obtained from a third party, more specifically, but not exclusively, by providing a model representing the computation on a distributed ledger.

BACKGROUND

In many fields and applications, models, such as Artificial Intelligence (AI)-based models, are used in decision making. Such models are often based on vast troves of data being used to train the respective models, and are often vital assets of the organizations that create them, providing them with an advantage over competing organizations. Consequently, large amounts of resources may be spent on creating, maintaining and updating such models, especially when they offer a competitive advantage over competitors. It may therefore be desired by said organizations to prevent competitors from understanding how their models function.

Some models are targeted to detecting and classifying customer behaviors using their personal identifiable information (PII). In some cases there are legal restrictions on the types of PII that can be used in making some types of business decisions. For example in some jurisdictions it may be forbidden to discriminate based on age, gender, location and other grounds when making a decision such as a loan application or a healthcare request. In some cases the customer has the right or wish to question the validity of a decision.

SUMMARY

There may be a desire for an improved concept that enables a user to verify the result of a computation by such a model, for example in view of a suspected discrimination based on the user's PII.

This desire is addressed by the subject of the independent claims.

Embodiments of the present disclosure provide a method for enabling a verification of a result of a computation obtained from a third party. The method comprises providing a model on a distributed ledger. The model represents the computation used by the third party. The method comprises providing access to the model for one or more users, to enable the users to verify the result of the computation.

Embodiments of the present disclosure provide a computer program having a program code for performing a method for enabling a verification of a result of a computation obtained from a third party, when the computer program is executed on a computer, a processor, or a programmable hardware component. The method comprises providing a model on a distributed ledger. The model represents the computation used by the third party. The method comprises providing access to the model for one or more users, to enable the users to verify the result of the computation.

Embodiments of the present disclosure provide a system for enabling a verification of a result of a computation obtained from a third party. The system comprises processing circuitry configured to provide a model on a distributed ledger. The model represents the computation used by the third party. The system comprises processing circuitry configured to provide access to the model for one or more users, to enable the users to verify the result of the computation.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
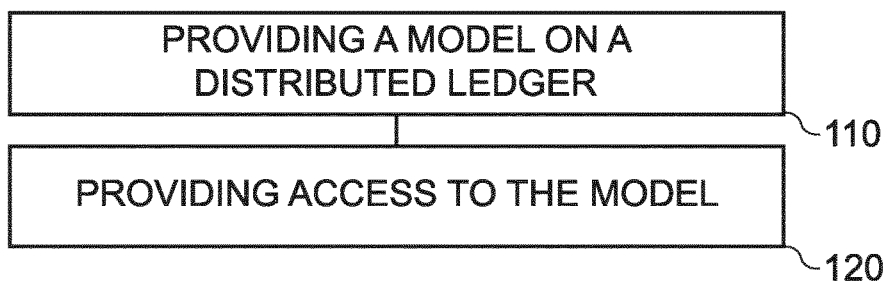
FIGS. 1a and 1b show flow charts of embodiments of a method for enabling a verification of a result of a computation obtained from a third party.
Figure 1B:
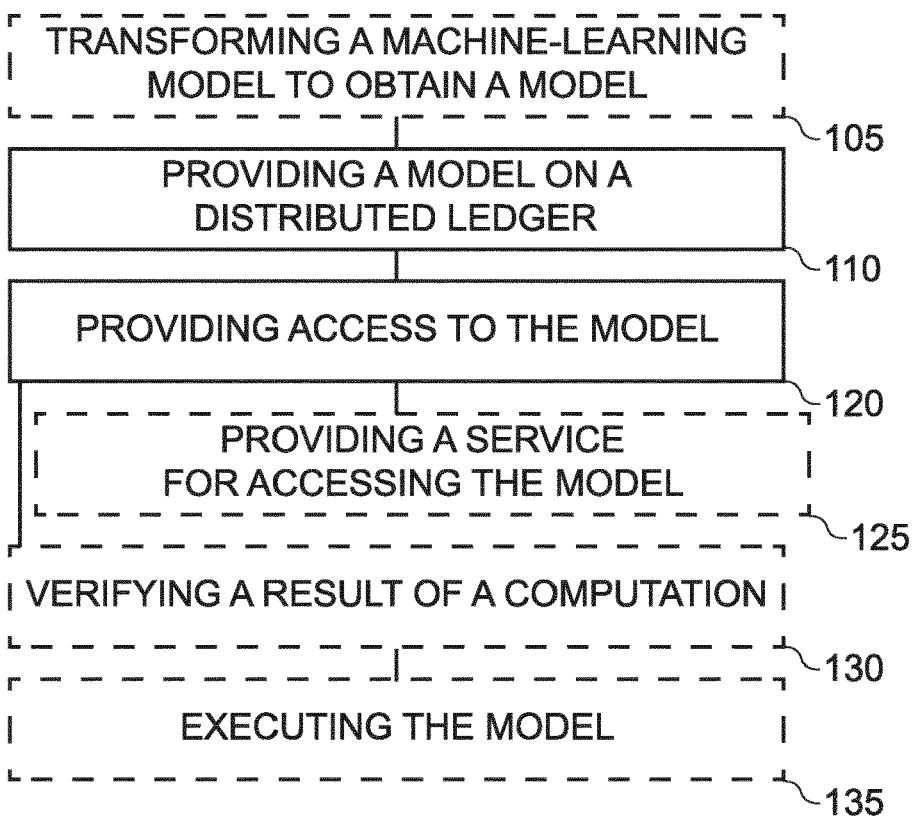

FIGS. 1a and 1b show flow charts of embodiments of a method, e.g. a computer-implemented method. The method is suitable for enabling a verification of a result of a computation obtained from a third party. The method comprises providing 110 a model on a distributed ledger. The model represents the computation used by the third party. The method comprises providing 120 access to the model for one or more users, to enable the users to verify the result of the computation. For example, the method may be executed by the system of FIG. 1c, e.g. using processing circuitry 100 of the system of FIG. 1c.

Figure 1C:
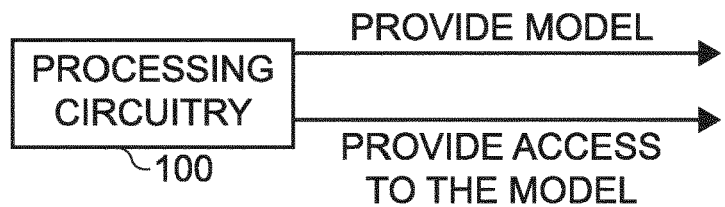
FIG. 1c shows a block diagram of an embodiment of a system for enabling a verification of a result of a computation obtained from a third party.

FIG. 1c shows a block diagram of an embodiment of a system for enabling a verification of a result of a computation obtained from a third party. The system comprises processing circuitry 100 configured to provide a model on a distributed ledger. The model represents the computation used by the third party. The system comprises processing circuitry 100 configured to provide access to the model for one or more users, to enable the users to verify the result of the computation.

The following description relates to both the method of FIGS. 1a and/or 1b and the system of FIG. 1c.

Embodiments of the present disclosure relate to a method, computer program and system suitable for enabling a verification of a result of a computation obtained from a third party. In many cases, decisions within an organization are taken based on data, e.g. data of previous transactions that have occurred in the past and which are used to infer decisions about transactions in the present. These decisions are often based on a vast trove of data, which has been accumulated by the respective organization. The data may be used to create a model, which is in turn used for calculating the decision. In many cases, the respective organizations attempt to keep the (details of) the respective models secret, as at least part of their competitive advantage is based on the knowledge accumulated within the model. Embodiments of the present disclosure may focus on providing means for a user to verify a decision computed by the third party, without forcing the third party to disclose the inner details of the model used for the computation. Thus, embodiments may be suitable for enabling a user to verify a decision by a business which is based on the outcome of a model without disclosing the inner details of the model.

The method comprises providing 110 the model on a distributed ledger. In information technology, a "distributed ledger" may be seen akin to a decentralized database: In a distributed ledger, data is stored and replicated in a plurality of nodes, and often accessible via each of the plurality of nodes. Additionally, a ruleset that is applied when adding data to the distributed ledger or when using data of the distributed ledger. Blockchain is a prominent example of a distributed ledger, i.e. the distributed ledger may be a blockchain-based distributed ledger. Other feasible options are directed acyclic graph-based distributed ledger. For example, the distributed ledger may be based on a directed acyclic graph, e.g. a block directed acyclic graph or a transaction-based acyclic graph. Providing the machine-learning model on the distributed ledger may comprise inserting the model into the distributed ledger, e.g. alongside a smart contract for accessing the model.

By providing the model on the distributed ledger, various properties of the distributed ledger may be leveraged. For example, one of the rules followed in many implementations of distributed ledger, such as blockchain, is the immutability of completed blocks from the chain. For example, the distributed ledger may comprise a plurality of (data) blocks, which are linked together in a chain (e.g. in blockchain-based distributed ledger) or in a directed acyclic graph (in directed acyclic graph-based distributed ledger). The blocks of the plurality of blocks may be cryptographically interlinked, i.e. blocks that are added to the plurality of blocks are cryptographically based on the content of the blocks that are already comprised in the plurality of blocks. Consequently, if a block is altered within the blockchain or directed acyclic graph, i.e. if the content of the block is changed, the cryptographic interlink to the blocks that have been added after the altered block is lost, as the basis for the cryptographic determination of the subsequent blocks is lost after altering the blocks. Consequently, any changes to existing blocks may be detected, making them immutable. For example, the model may be immutable within the distributed ledger, i.e. stored in an immutable fashion within the distributed ledger. If the model is stored in an immutable fashion, it can be used to retroactively prove that it has not been changed since the result has been obtained from the third party.

Additionally or alternatively, further properties inherent to at least some implementations of distributed ledger may be used. For example, in some embodiments, the model may be provided on the distributed ledger such that it is (only) executable within the distributed ledger. In other words, the model provided on the distributed ledger may be limited to the distributed ledger, e.g. an execution of the model may be limited to within the distributed ledger. For example, the model may be stored within the distributed ledger such that it cannot be retrieved from the distributed ledger. For example, access to the model may be provided publicly via the distributed ledger, while inner parts and operations of the model remain inaccessible within the distributed ledger. For example, access to the model provided on the distributed ledger may be provided via a so-called smart contract, which may be a wrapper that is suitable for accessing the model on the distributed ledger and which may restrict an access to the model on the distributed ledger. On the distributed ledger, merely a TRUE or FALSE statement may be provided instead of the results. TRUE may indicate that the previously obtained result corresponds to the result calculated in the distributed ledger, and FALSE may indicate that it does not. This may further enhance protection of the inner parts and operations of the model. Furthermore, each execution of the model within the distributed ledger may be logged within the distributed ledger. In other words, information about each execution of the model within the distributed ledger may be stored within a block that is added to the distributed ledger.

The model represents the computation used by the third party. In other words, the computation of the result obtained from the third party may be based on a further model that is, at least for the computation at hand, functionally equivalent to the model provided on the distributed ledger. The model provided on the distributed ledger may be suitable for recreating the result of the computation, at least for the user that is provided with the result of the computation by the third party. In at least some embodiments, the model might not be specific to a (single) user, but might be a model that represents the computation used by the third party to provide the plurality of results for the plurality of different users. In other words, the model may be suitable for recreating a plurality of results of a plurality of computations for a plurality of different users. The model may represent the computation used by the third party to obtain a plurality of results of a plurality of computations for a plurality of different users. For example, the further model used by the third party may be a machine-learning model (i.e. an AI model) or any other model suitable for computing a decision, e.g. based on one or more input values associated with the user. In other words, the further model may be a machine-learning model. Alternatively, other kinds of models may be used.

If the model provided on the distributed ledger is based on the further model, the further model may be transformed into the model to be provided on the distributed ledger. For example, the method may comprise transforming the further model to obtain the model, and to provide the transformed further model as model on the distributed ledger. In particular, the further model may be a machine-learning model, i.e. a machine-learning model that is used by the third party for the computation of the result. The method may comprise transforming 105 the machine-learning model to obtain the model. In this context, the term "transforming" may denote a process in which a model having a first type (i.e. the further model/machine-learning model) is converted into an (at least partially) functionally equivalent model having a second type (i.e. the model provided on the distributed ledger).

One type of model that can be used for verifying the result of the computation is a so-called zero knowledge proof model. For example, the model may be a zero knowledge proof model. A zero knowledge proof model is a model that is suitable for verifying a result of a computation without disclosing the details used for the computation. In this context, "zero knowledge proof" denotes that a proof of a computation can be furnished without disclosing any knowledge that is used for the computation. When using a zero knowledge proof model, one or more input values and a result is provided as input to the zero knowledge proof model, and a binary value is obtained at an output of the zero knowledge proof model, the binary value indicating whether the result is obtainable based on the one or more input values provided. In embodiments, the zero knowledge proof model may be a transformed version of the further model (e.g. of the machine-learning model). In other words, the method may comprise transforming the further model/machine-learning model to obtain the zero knowledge proof model. The further model/machine-learning model may have been used for the computation of the result. In embodiments, the zero knowledge proof model may be based on the zk-SNARKs (zero-knowledge succinct non-interactive argument of knowledge) framework. In non-interactive zero-knowledge proof approaches, no interaction between prover (i.e. the third party) and verifier (i.e. the user) is necessary. In other words, the model may be a non-interactive zero-knowledge proof model.

At least some embodiments of the present disclosure are directed at enabling a verification of a result of a computation obtained from a third party. In some cases, the result of the computation obtained from the third party is a result of a business decision obtained from a business, with the business decision being computed by the business, e.g. using a machine-learning model. In other words, the third-party may be a business, and the result to be verified may be a business decision that is computed by the business. The user, or the one or more users, may be customers of the business, e.g. private customers or other businesses. For example, the machine-learning model may be suitable for calculating business decisions. For example, the machine-learning model may be suitable for computing the business decision based on one or more input values, the at least a subset of the one or more input values being specific to the user for whom the business decision is to be computed. In other words, at least a subset of the one or more input values may be specific to the user for whom the business decision is to be computed. For example, the one or more input values may comprise at least one of a location information about the user, an age value of the user, an income value of the user, a health precondition of the user, and an occupation of the user. In various embodiments, the one or more input values may comprise one or more business-specific parameters that the user has obtained alongside the result from the third party, e.g. a credit rate.

The method comprises providing 120 access to the model for one or more users, to enable the users to verify the result of the computation. In this context, "providing access to the model for one or more users" may denote that the one or more users are enabled to use the model to verify the result of the computation, but not necessarily that the model is completely accessible within the distributed ledger. Access to the model may be provided such that one or more users can input the one or more input values and obtain a result or a decision about the result that is based on the model. In at least some embodiments, a service or interface may be provided that enables the one or more users to use the model within the distributed ledger, thus providing access to the model, without making the model completely accessible to the one or more users.

For example, the method may comprise providing 125 a service for verifying the result of the computation, e.g. based on one or more input values provided by the respective user. For example, by providing 125 the service, access may be provided 120 to the model. In other words, access to the model may be provided 125 through the service. For example, the service may enable the one or more users to verify their respective results. The service may be provided via the distributed ledger, e.g. as a smart contract, or the service may be merely based on the model provided on the distributed ledger. For example, the service may be provided via a web interface (that may be used by the one or more users to input the input data and the result) or via an application programming interface (API) that may be used by one or more applications having access to the service. The service or interface may be used to shield the model from the one or more users. In other words, the model might only be accessible via an interface, e.g. API or web, of the service for verifying the result of the computation. Access to the model may be shielded and/or restricted using a smart contract that is suitable for accessing the model provided on the distributed ledger.

In some cases, the service may provide a web interface, which the one or more users may use to verify the result of the computation provided by the third party. The web interface may be used to input the one or more input values. Additionally, the web interface may be used to input the result to be verified (i.e. the result obtained from the third party), e.g. for comparison with the result recreated by the model provided on the distributed ledger. For example, the model provided on the distributed ledger may accept the one or more input values and the result as inputs, and may be suitable for obtaining a binary value indicating whether the result is obtainable using the one or more input values. For example, the model might not be suitable for outputting the actual result, but only a binary value representing a comparison and/or accordance between the result provided at the input and the result to be verified based on the one or more input values. In such cases, the result obtained from the third party may be provided as an input to the service, e.g. via the web interface. In other words, the one or more input values and the result to be verified may be input (to the service or the model) via the web interface. In many cases, the one or more input values may be required to be in an appropriate format, so it or they can be understood by the model. This format may differ from the format being input via the web interface. For example, a user of the one or more users may input their address or occupation in plain text using the web interface. In plain text form, this input may be unsuitable for the model, as the model may be based on abstract values that are derivable from the plain text provided by the user. Consequently, in some embodiments, the method comprises converting the plain text input values to coded input values that are suitable for the mode. In other words, the one or more input values may be coded input values. The method may comprise generating the one or more input coded values from human-readable input (i.e. the plain text) to the web interface. For example, the one or more input values entered by the user may comprise at least one of a plain text address, an age value, an income value, a health precondition and an occupational title of the user. The method may comprise generating the one or more input coded input values based on said one or more input values entered by the user to obtain at least one of a coded location information, an age bracket, an income bracket, a coded health assessment and a coded occupation of the user, which may then be used as one or more coded input values for the model.

In at least some embodiments, in addition to, or as a means for, providing the one or more users with access to the model, the method may comprise verifying the result of the computation. In this context, "verifying the result of the computation" may be understood as recreating the computation using the model, and returning the result of the computation, or as recreating the computation using the model, comparing the result of the computation with the result to be verified (i.e. the result obtained from the third party), and returning information about the comparison of the result of the computation with the result to be verified. The result may be verified by executing the model, i.e. by recreating the result using the model. In other words, the method may comprise verifying 130 the result of the computation, by recreating the result using the model and one or more input values provided by the respective user. The result may be recreated and compared with the result to be verified within the model. In other words, intermediate values or intermediate results generated in the recreation of the results may be inaccessible from outside the model. The method may comprise recreating the result, e.g. within the model, using the model and one or more input values provided by the respective user (and, optionally, the result to be verified), and providing information about a comparison (i.e. an accordance) between the recreated result and the result to be verified to the respective user. In other words, an output of the model may be a binary value indicating an accordance between the recreated result and the result to be verified.

In at least some embodiments, the result is verified by executing 135 the model within the distributed ledger using the one or more input values (thereby recreating the result), and comparing the recreation of the result obtained by the model with the result to be verified. For example, the model may be executed within the distributed ledger using a so-called smart contract that is used to perform the verification using the model. The smart contract may provide a wrapper for the model, i.e. the model may (only) be accessed via the smart contract.

The smart contract may define the input(s) and/or output(s) when executing the model within the distributed ledger. Furthermore, the smart contract may trigger and/or control the execution of the model within the distribution, and provide the binary value indicating the accordance between the recreated result and the result to be verified (or the recreated result) to a user requesting the verification of the result.

Furthermore, the model may be executed within the distributed ledger in a way that restricts the execution of the model, thereby avoiding scenarios in which the model can be reverse-engineered/replayed by executing the model using a large range of feasible input values. For example, the verification of the result (e.g. the execution of the model) may be logged 140 (i.e. information on the verification of the result may be stored) within the distributed ledger, thereby providing an auditable trace. Additionally, a number of permitted executions of the model (e.g. a total number or a number per unit of time) within the distributed ledger may be limited. A number of executions of the model within the distributed ledger may be logged (within the distributed ledger). Both the logging and the number of permitted executions may be defined by the smart contract that is used for accessing the model. In some cases, such a rate limiting might be inherent to the provision of the model on the distributed ledger, as it may take time to execute the smart contract within the distributed ledger, and replays may be shown in an audit log of the smart contract/distributed ledger.

As written above, the method may be a computer-implemented method executed by processing circuitry 100. In embodiments the processing circuitry 100 may be implemented using one or more processing units, one or more processing devices, any means for processing, such as a processor, a computer or a programmable hardware component being operable with accordingly adapted software. In other words, the described function of the processing circuitry 100 may as well be implemented in software, which is then executed on one or more programmable hardware components. Such hardware components may comprise a general purpose processor, a Digital Signal Processor (DSP), a micro-controller, etc. In at least some embodiments, the processing circuitry may be configured to access and/or manipulate the distributed ledger, e.g. by executing the smart contract used for accessing the model. In some embodiments, each of the method steps may be executed by the same processing circuitry, e.g. the same processor or same group of processors. Alternatively, the method may be executed by a plurality of devices comprising processing circuitry, each of the devices performing one or more features of the method. For example, one device may be configured to transform the further model/machine-learning model to obtain a model. A further device may be configured to provide the model on the distributed ledger. A further device may be used provide the service, to verify the model, and to execute the model within the distributed ledger. The system may be implemented in a node of the distributed ledger. The system may further comprise at least one interface for communicating with one or more further nodes of the distributed ledger, and for providing the interface for the one or more users. The at least one interface may correspond to one or more inputs and/or outputs for receiving and/or transmitting information, which may be in digital (bit) values according to a specified code, within a module, between modules or between modules of different entities. For example, the at least one interface may comprise interface circuitry configured to receive and/or transmit information.

At least some embodiments are based on using a machine-learning model or machine-learning algorithm. Machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge, e.g. based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine. Support vector machines (i.e. support vector networks) are supervised learning models with associated learning algorithms that may be used to analyze data, e.g. in classification or regression analysis. Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

More details and aspects of the method, computer program and system are mentioned in connection with the proposed concept or one or more examples described above or below (e.g. FIG. 2). The method, computer program and system may comprise one or more additional optional features corresponding to one or more aspects of the proposed concept or one or more examples described above or below.

At least some embodiments of the present disclosure relate to a trusted scoring of secured models. Using various embodiments, businesses can secure their AI models (e.g. the machine-learning model) while allowing customers (e.g. the one or more users) the ability to verify the correctness and validity of a decision taken by the AI model (hereon known as a model).

Embodiments provide a method of converting and securing a Business AI model (i.e. the machine-learning model/ further model) in the form of a Zero Knowledge Proof (ZKP) model (i.e. the model provided on the distributed ledger), for example using zkSNARKs. This secured model (ZKPM) is then published to a Distributed Ledger (DL) which may maintain auditability & traceability of the model used to make a business decision. These properties may allow a customer (or Regulators on behalf of the Customer) to verify the validity of the decision made by the original model inside the ZKPM. The use of zkSNARKs is only an example—more general or performant Zero Knowledge Proofs (ZKP) may be used as model that is provided on the distributed ledger.

There are numerous different scenarios whereby a customer might want to verify the validity of a business decision. For example, a customer makes a loan application that is refused along with a document (MD) detailing the model result (R) (e.g. the result to be verified) and business specific parameters (P). The Customer does not accept R and believes that Business model is biased against them because of their PII (Personal Identifiable Information). Although described between a customer and a business, the example above is not only relevant or applicable to customers. It is equally valid in the B2B case where businesses want to verify the validity of a decision taken by another Business(es). Consequently, the one or more users described in connection with FIG. 1a to 1c may be customers or businesses, and the third party may be a business.

Figure 2:
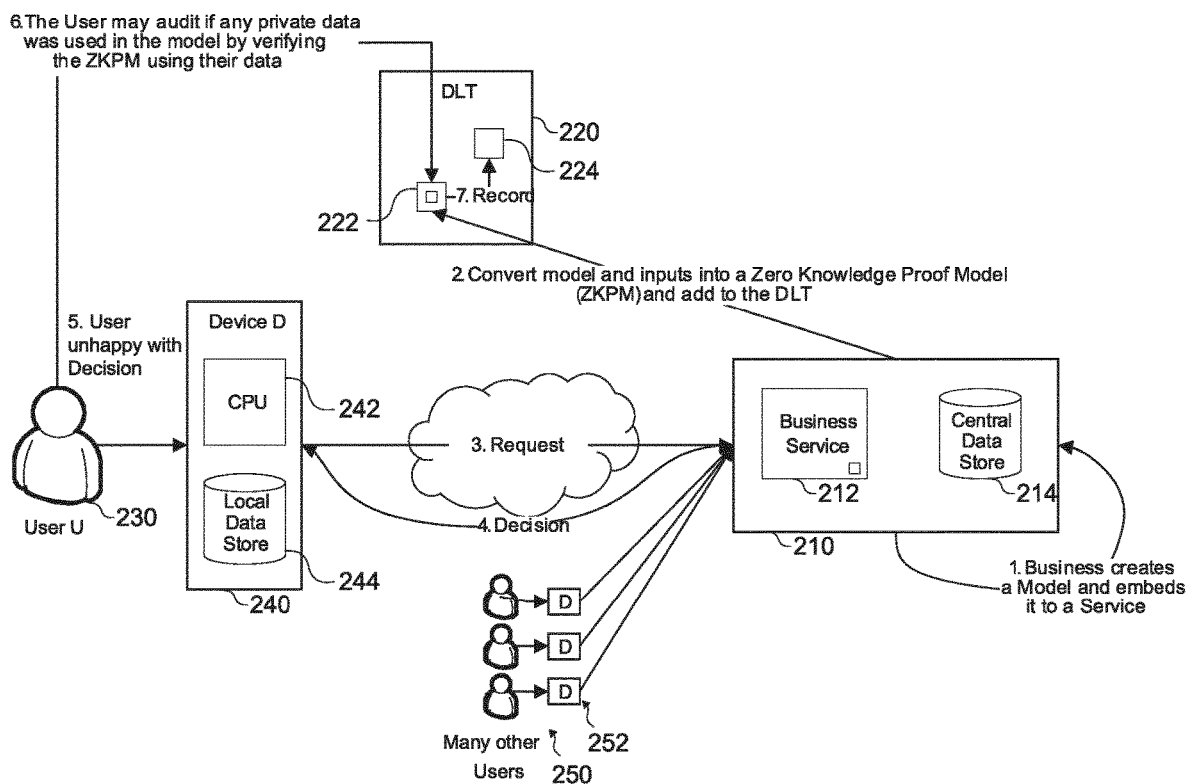
FIG. 2 shows a schematic diagram of an exemplary flow of information in a system according to an embodiment.

FIG. 2 shows a schematic diagram of an exemplary flow of information in a system according to an embodiment. As shown in FIG. 2, in block 210, in (1), a business creates a model and embeds it into a service 212. Block 210 comprises the business service 212, and a central data store 214, which may hold the model. In (2), the Model is protected and published publically using Distributed Ledger Technology (DLT) so that its correctness can be verified. For example, the model is converted and input into a ZKPM (i.e. the model provided on the distributed ledger) 222, and added to a DLT 220 (i.e. the distributed ledger). The DLT 220 comprises the ZKPM 222. In (3), the user U 230 may use a Device D 240, the device comprising a Central Processing Unit 242 and a local data store 244, to request a decision (4) from the business service 212. The customer makes a request (3) to the business 210 and the business scores the request using customer data (either stored in a database or directly provided by the customer). The Business returns a decision (4) and a decision document with the result and the business parameters used. Other users 250, using their Devices 252, may do the same. In (5), the User U is not happy with the decision and believes the decision is biased against him/her. In (6), the user can audit if any private data was used by verifying the ZKPM 222 using their data. For example, if the model relies on external, obfuscated data sources containing PII, these data source may have to be available when the evaluation is run, or the result may not match. The access to undocumented input values may be traced, and may raise concerns if the model is audited. The customer may execute the published ZKPM 222 using his/her PII and the decision document. There are many usage scenarios possible. For example, the customer may execute the model with old, out of date PII data and its latest PII data and sees that the model result is TRUE for old data. They can then contact the company to update their information. Alternatively or additionally, the customer may execute the model with deliberately modified PII to test if the model is biases by PII changes. If so, and if the model should not be using this information, the customer may challenge the decision with the Business or a 3rd Party (i.e. a regulator). In (7), the verification of the ZKPM 222 may be recorded/logged 224 within the DLT 220. Each model execution will be recorded (7) on the chain/distributed ledger in an untamperable way.

Since the model was published to an untamperable Distributed Ledger (DL) e.g. a blockchain, the customer can then check the correctness of the decision by replaying (e.g. recreating the result) their application (R+P) along with their PII data to the model (e.g. as the one or more input values and the result to be verified). The Customer can also replay modified versions of their PII to check if there is any bias in the model. The ZKPM might only return a (binary) TRUE result in the case that the inputs PII+P produce the same result R. If there is any variation in the P or PII then ZKPM may return FALSE. In this way the Customer may be enabled to easily check/verify whether a model is potentially using PII (e.g. in a discriminatory fashion). Using embodiments, the inner details and commercially sensitive operations of the model might not be revealed. Furthermore, by using DLT for the execution of ZKPM is, in at least some embodiments, a untamperable record showing how many times a customer has executed the model may be created. This helps to prevent a customer or other parties (i.e. commercial competitors) from continually replaying requests to the model in an effort to reverse engineer and understand how it operates.

Using embodiments, a business may protect their commercially sensitive models from being reverse engineered through protecting the model and executing it in an untamperable manner using DLT. A Customer (or other Business in a Business-to-Business (B2B) case) can validate the correctness of the published protected Model when using their data. At least some embodiments may be offered as a public service. Information on how the model is protected and how the technology may be used may be published with the mode. In some embodiments, the model may be provided on the distributed ledger according to a regulatory standard, e.g. if regulators require business to publish their models.

More details and aspects of embodiments are mentioned in connection with the proposed concept or one or more examples described above or below (e.g. FIGS. 1*a* to 1*c*). Embodiments may comprise one or more additional optional features corresponding to one or more aspects of the proposed concept or one or more examples described above or below.

The following examples pertain to further embodiments:
(1) A method for enabling a verification of a result of a computation obtained from a third party, the method comprising:
Providing 110 a model on a distributed ledger, the model representing the computation used by the third party; and
Providing 120 access to the model for one or more users, to enable the users to verify the result of the computation.

(2) The method according to (1), comprising verifying 130 the result of the computation, by recreating the result using the model and one or more input values provided by the respective user.
(3) The method according to (2), wherein the result is recreated and compared with the result to be verified within the model.
(4) The method according to (3), wherein an output of the model is a binary value indicating an accordance between the recreated result and the result to be verified.
(5) The method according to one of (2) to (4), wherein the result is verified by executing 135 the model within the distributed ledger using the one or more input values, and comparing the recreation of the result obtained by the model with the result to be verified.
(6) The method according to (5), wherein a number of permitted executions of the model within the distributed ledger is limited or wherein a number of executions of the model within the distributed ledger is logged.
(7) The method according to one of (1) to (6), wherein the model is a zero knowledge proof model.
(8) The method according to (7), wherein the zero knowledge proof model is a transformed version of a further model, the further model being used for the computation of the result.
(9) The method according to one of (1) to (8), wherein a machine-learning model is used for the computation of the result, the method comprising transforming 105 the machine-learning model to obtain the model.
(10) The method according to one of (8) or (9), wherein the machine-learning model is a machine-learning model for calculating business decisions.
(11) The method according to one of (1) to (10), wherein the verification of the result is logged within the distributed ledger, thereby providing an auditable trace.
(12) The method according to one of (1) to (11), wherein the model is immutable within the distributed ledger.
(13) The method according to one of (1) to (12), wherein the model represents the computation used by the third party to obtain a plurality of results of a plurality of computations for a plurality of different users.
(14) The method according to one of (1) to (13), comprising providing 125 a service for verifying the result of the computation based on one or more input values provided by the respective user.
(15) The method according to (14), wherein the model is only accessible via an interface of the service for verifying the result of the computation.
(16) The method according to one of (14) or (15), wherein the interface is a web interface, the one or more input values and a result to be verified being input via the web interface.
(17) The method according to (16), wherein the one or more input values are coded input values, the method comprising generating the coded input values from human-readable input to the web interface.
(18) A computer program having a program code for performing the method of one of (1) to (17), when the computer program is executed on a computer, a processor, or a programmable hardware component.
(19) A system for enabling a verification of a result of a computation obtained from a third party, the system comprising:

processing circuitry configured to provide a model on a distributed ledger, the model representing the computation used by the third party; and processing circuitry configured to provide access to the model for one or more users, to enable the users to verify the result of the computation.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for enabling a verification of a result of a computation obtained from a third party, the method comprising:

providing a model on a distributed ledger, the model representing the computation used by the third party;

providing access to the model for one or more users, to enable the users to verify the result of the computation, wherein a machine-learning model is used for the computation of the result; and transforming the machine-learning model to obtain the model.

2. The method according to claim 1, further comprising verifying the result of the computation, by recreating the result using the model and one or more input values provided by a respective user of the one or more users.

3. The method according to claim 2, wherein the result is recreated and compared with the result to be verified within the model.

4. The method according to claim 3, wherein an output of the model is a binary value indicating an accordance between the recreated result and the result to be verified.

5. The method according to claim 2, wherein the result is verified by executing the model within the distributed ledger using the one or more input values, and comparing the recreation of the result obtained by the model with the result to be verified.

6. The method according to claim 5, wherein a number of permitted executions of the model within the distributed ledger is limited or wherein a number of executions of the model within the distributed ledger is logged.

7. The method according to claim 1, wherein the model is a zero knowledge proof model.

8. The method according to claim 7, wherein the zero knowledge proof model is a transformed version of a further model, the further model being used for the computation of the result.

9. The method according to claim 1, wherein the machine-learning model is a machine-learning model for calculating business decisions.

10. The method according to claim 1, wherein the verification of the result is logged within the distributed ledger, thereby providing an auditable trace.

11. The method according to claim 1, wherein the model is immutable within the distributed ledger.

12. The method according to claim 1, wherein the model represents the computation used by the third party to obtain a plurality of results of a plurality of computations for a plurality of different users.

13. The method according to claim 1, further comprising providing a service for verifying the result of the computation based on one or more input values provided by the respective user.

14. The method according to claim 13, wherein the model is only accessible via an interface of the service for verifying the result of the computation.

15. The method according to claim 13, wherein an interface is a web interface, the one or more input values and a result to be verified being input via the web interface.

16. The method according to claim 15, wherein the one or more input values are coded input values, the method comprising generating the coded input values from human-readable input to the web interface.

17. A non-transitory computer-readable medium configured to store a computer program having a program code for performing the method of claim 1, when the computer program is executed on a computer, a processor, or a programmable hardware component.

18. A system for enabling a verification of a result of a computation obtained from a third party, the system comprising:
processing circuitry configured to
provide a model on a distributed ledger, the model representing the computation used by the third party,
provide access to the model for one or more users, to enable the users to verify the result of the computation,
wherein a machine-learning model is used for the computation of the result, and
transform the machine-learning model to obtain the model.

* * * * *